United States Patent
Testoni et al.

(10) Patent No.: US 11,641,884 B2
(45) Date of Patent: May 9, 2023

(54) SYSTEM FOR CONVEYING ELECTRONIC CIGARETTE COMPONENTS

(71) Applicant: G.D S.p.A., Bologna (IT)

(72) Inventors: Luca Testoni, Castel Maggiore (IT); Carlo Moretti, Bologna (IT); Paolo Degliesposti, Bologna (IT); Luca Lanzarini, Crespellano (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 65 days.

(21) Appl. No.: 17/353,072

(22) Filed: Jun. 21, 2021

(65) Prior Publication Data
US 2021/0307408 A1    Oct. 7, 2021

Related U.S. Application Data

(62) Division of application No. 16/650,827, filed as application No. PCT/IB2018/057347 on Sep. 24, 2018, now Pat. No. 11,089,819.

(30) Foreign Application Priority Data

Sep. 29, 2017    (IT) .................. 102017000109192

(51) Int. Cl.
*A24F 40/70*    (2020.01)
*B61B 13/12*    (2006.01)
(Continued)

(52) U.S. Cl.
CPC .............. *A24F 40/70* (2020.01); *B61B 13/12* (2013.01); *B65G 54/02* (2013.01);
(Continued)

(58) Field of Classification Search
None
See application file for complete search history.

(56) References Cited

U.S. PATENT DOCUMENTS

| 4,576,828 A | 3/1986 | Walker |
| 5,626,082 A | 5/1997 | Nozaki |

(Continued)

FOREIGN PATENT DOCUMENTS

| CN | 105645056 A | 6/2016 |
| CN | 114161145 A * | 3/2022 |

(Continued)

OTHER PUBLICATIONS

International Search Report and Written Opinion dated Dec. 11, 2018 for counterpart International Application No. PCT/IB2018/057347.

*Primary Examiner* — Joseph A Dillon, Jr.
(74) *Attorney, Agent, or Firm* — Shuttleworth & Ingersoll, PLC; Timothy Klima

(57) ABSTRACT

A system for conveying electronic cigarette components, including: a guide including a stopping station; a carriage to slide along the guide; a retaining device for holding a component of an electronic cigarette; and a locking unit for locking the carriage relative to the guide at the stopping station. The locking unit includes: two abutment elements mounted on the carriage and disposed at a predetermined mutual distance; and an inserting element which is: disposed at the stopping station shaped such that first and second edges contact the abutment elements, respectively, when the carriage is at the stopping station; movable between a retracted position free from the abutment elements to allow the carriage to slide, and an advanced position contacting the abutment elements to prevent the carriage from sliding. Each abutment element is rotatable about its axis to facilitate movement of the inserting element between the two positions.

6 Claims, 12 Drawing Sheets

(51) Int. Cl.
    *B65G 54/02*        (2006.01)
    *H02K 33/00*        (2006.01)
(52) U.S. Cl.
    CPC .. *B65G 2201/0226* (2013.01); *B65G 2205/00* (2013.01); *H02K 33/00* (2013.01)

(56)                References Cited

U.S. PATENT DOCUMENTS

| | | | |
|---|---|---|---|
| 6,971,832 | B2 | 12/2005 | Ackeret et al. |
| 11,191,305 | B2 * | 12/2021 | Madera .................. A24F 40/70 |
| 2001/0007961 | A1 * | 7/2001 | Kano ..................... H05K 13/02 |
| | | | 198/619 |
| 2003/0136086 | A1 | 7/2003 | Kalany et al. |
| 2015/0217887 | A1 | 4/2015 | Jacobs |
| 2015/0367555 | A1 | 12/2015 | Winzinger |
| 2016/0338408 | A1 * | 11/2016 | Guenther, Jr. ........ B23P 19/027 |
| 2017/0158436 | A1 * | 6/2017 | Slurink ................ B65G 47/088 |
| 2017/0225908 | A1 | 8/2017 | Staunton et al. |
| 2018/0082877 | A1 | 3/2018 | Hosek |
| 2018/0273222 | A1 | 9/2018 | Jacobs et al. |
| 2019/0311932 | A1 | 10/2019 | Ehrne et al. |
| 2020/0207496 | A1 * | 7/2020 | Schwab ................. B29C 51/46 |
| 2021/0378317 | A1 * | 12/2021 | Testoni ................. B65B 43/54 |

FOREIGN PATENT DOCUMENTS

| | | | |
|---|---|---|---|
| CN | 114711459 A | * | 7/2022 |
| EP | 3034441 A1 | | 6/2016 |
| WO | 2016189485 A1 | | 12/2016 |

\* cited by examiner

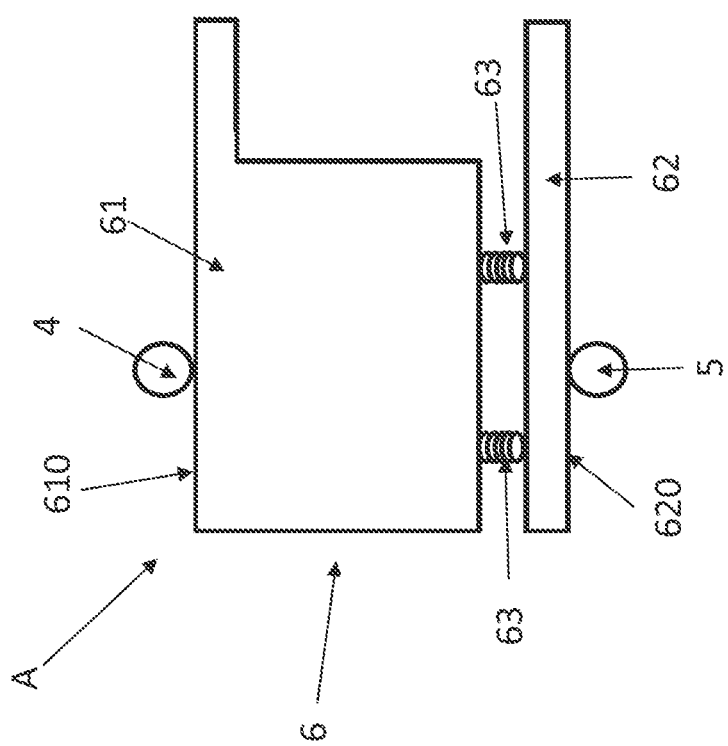

SYSTEM FOR CONVEYING ELECTRONIC CIGARETTE COMPONENTS

This application is a divisional of U.S. application Ser. No. 16/650,827 filed Mar. 25, 2020 which is a National Phase of International Application PCT/IB2018/057347 filed Sep. 24, 2018 which designated the U.S.

This application claims priority to Italian Patent Application No. 102017000109192 filed Sep. 29, 2017. All above referenced applications are incorporated by reference herein.

TECHNICAL FIELD

This invention addresses the technical field of electronic cigarettes. More specifically, the invention relates to a system for conveying electronic cigarette components.

BACKGROUND ART

In recent times, the production of electronic cigarettes has become more and more automated; in particular, automatic stations are dedicated to operations which differ greatly from each other: for example, assembling the components, filling the cartridges with the liquid to be vaporized, inspecting the assembled groups, etc.

More in detail, the components of the electronic cigarettes are assembled in several steps, during which the components are fed in one by one and assembled to each other.

For this purpose, there are a plurality of consecutive stations, each dedicated to feeding a specific component and assembling it to a group of components formed previously.

Generally speaking, the assembly stations are disposed in a row and, to convey the components from one station to another, there may be a conveying system which comprises a guide which extends at the stations and carriages which are slidable along the guide.

Each carriage comprises carrier units designed to hold the components which are assembled to each other as the carriage moves along the guide. More specifically, a carriage moving along the guide stops at a first assembly station, where a first component, disposed and held on the carriage, is fed to it. The carriage then continues along its path until it reaches the second assembly station, where it stops and allows a second component to be fed in and assembled to the first components which is already disposed and held on the carriage.

These steps are repeated until all the components have been assembled to each other on the carriage to form a group which can be unloaded from the carriage and, if necessary, sent on to further processing stations.

Owing to the small size of the components, the assembly operations require a very high degree of precision. Thus, the carriages must be positioned extremely precisely at each assembly station.

In many cases, however, the conveying systems of the type described above are unable to guarantee the degree of precision needed to correctly position the carriages, independently of the type of movement of the carriages.

DISCLOSURE OF THE INVENTION

The aim of this invention is to overcome the above mentioned disadvantages. This aim is achieved by proposing a system for conveying electronic cigarette components according to the accompanying claims.

Advantageously, the conveying system proposed by this invention guarantees that the carriages are positioned exactly, thereby allowing the electronic cigarette components to be optimally assembled to each other.

BRIEF DESCRIPTION OF THE DRAWINGS

These and other advantages are more apparent in the description which follows, with reference to the accompanying drawings, in which:

FIG. 10 is a schematic plan view of some details of the system according to the invention in a variant different from the one illustrated in the preceding figures;

DETAILED DESCRIPTION OF PREFERRED EMBODIMENTS OF THE INVENTION

Figure 1:
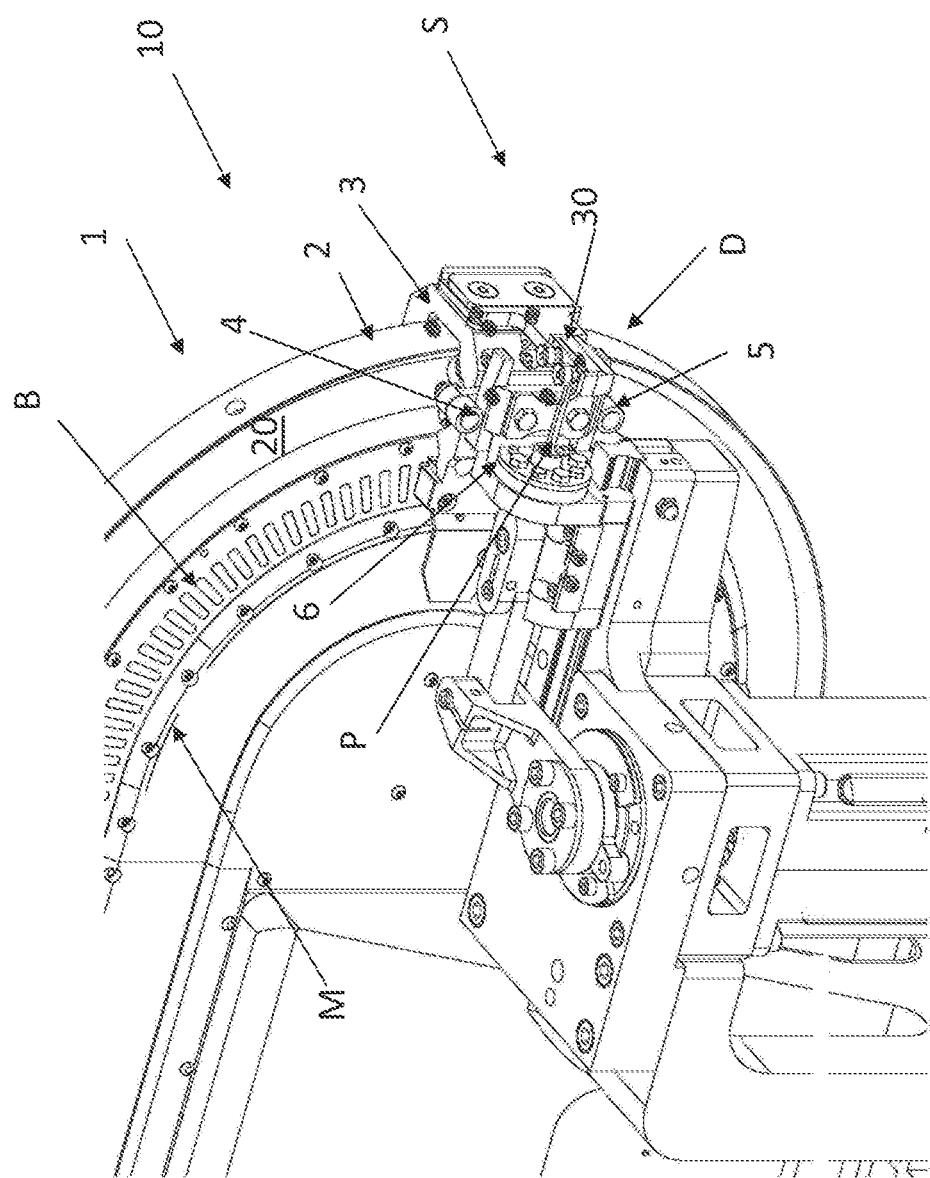
FIG. 1 shows a partial perspective view of a system for conveying electronic cigarette components according to a first embodiment of the invention.

The accompanying drawings show different embodiments of the invention. The parts common to all the embodiments are denoted by the same reference numbers.

With reference to the accompanying drawings, the numeral 1 denotes a system for conveying electronic cigarette components (which are not illustrated).

The expression "electronic cigarette components" is used to mean those parts that need to be assembled (that is, joined) to each other to make up an electronic cigarette.

The system 1 according to the invention comprises: a guide 2 in turn comprising at least one stopping station S; at least one carriage 3 configured to slide along the guide 2 and comprising retaining means 30 (illustrated schematically and by way of example) for holding at least one component of an electronic cigarette; and a locking unit 4, 5, 6 for locking the carriage 3 relative to the guide 2 at the stopping station S.

More specifically, the locking unit 4, 5, 6 comprises: at least two abutment elements 4, 5 mounted on the carriage 3 and disposed at a predetermined mutual distance; and at least one inserting element 6 disposed at the stopping station S and shaped in such a way that its first and second edges 610 and 620 come into contact with the two abutment elements 4, 5, respectively, when the carriage 3 is at the stopping station S. The inserting element 6 is movable (in a sliding direction) between a retracted position R, where it does not contact the two abutment elements 4, 5 and (mechanically) allows the carriage 3 to slide relative to the guide 2, and an advanced position A where it contacts the two abutment elements 4, 5 and prevents the carriage 3 from sliding relative to the guide 2 (that is, it keeps the carriage 3 at the stopping station S). The fact that when the inserting element 6 is at the retracted position R, it (mechanically) allows the carriage 3 to slide relative to the guide 2 does not exclude the presence of other locking means of a non-mechanical type (as explained in more detail below).

Further, each abutment element 4, 5 is rotatable about its axis in such a way as to facilitate movement of the inserting element 6 between the two positions A, R.

Advantageously, the conveying system 1 according to the invention ensures that the carriage 3 is correctly positioned at the stopping station S (obtained by mechanical locking). In effect, moving the inserting element 6 to the advanced position A (when the carriage 3 is at the stopping station S), into contact with the two abutment elements 4, 5, ensures that the carriage 3 is stopped in a particularly simple and precise manner.

More in detail, the fact that the two abutment elements 4, 5 are each freely rotatable about their axes totally prevents them from scraping against the inserting element 6 (specifically, the edges 610, 620 thereof) and, instead, facilitates movement of the inserting element 6 between the two positions A, R. In other words, the edges 610, 620 of the inserting element 6 and the abutment elements 4, 5 can slide relative to each other during the movement of the inserting element 6.

If that were not the case, the scraping action between the parts would lead to wear and, eventually, to imprecise positioning of the carriage and unwanted stresses.

With reference to a first embodiment, illustrated in FIGS. 1-10, the inserting element 6 is shaped in such a way as to be inserted between the two abutment elements 4, 5 when the carriage 3 is at the stopping station S. According to this first embodiment, the inserting element 6 is movable between the retracted position R, where it is not inserted between the two abutment elements 4, 5 and allows the carriage 3 to slide relative to the guide 2, and the advanced position A where it is inserted between the two abutment elements 4, 5 and, with its edges 610, 620, is in contact with the abutment elements 4, 5 to prevent the carriage 3 from sliding relative to the guide 2.

Advantageously, in this case, the fact that the two abutment elements 4, 5 are each freely rotatable about their axes not only totally prevents them from scraping as mentioned above but, at the same time, also urges the inserting element 6 into the correct position between the two abutment elements 4, 5. In effect, the two abutment elements 4, 5 are made to rotate by contact with the inserting element 6 and thus facilitate its movement between the abutment elements. This solution is particularly compact because the inserting element 6 does not protrude beyond the abutment elements 4, 5 (sideways, that is, along the sliding direction of the carriage 3 along the guide 2).

Figure 9:
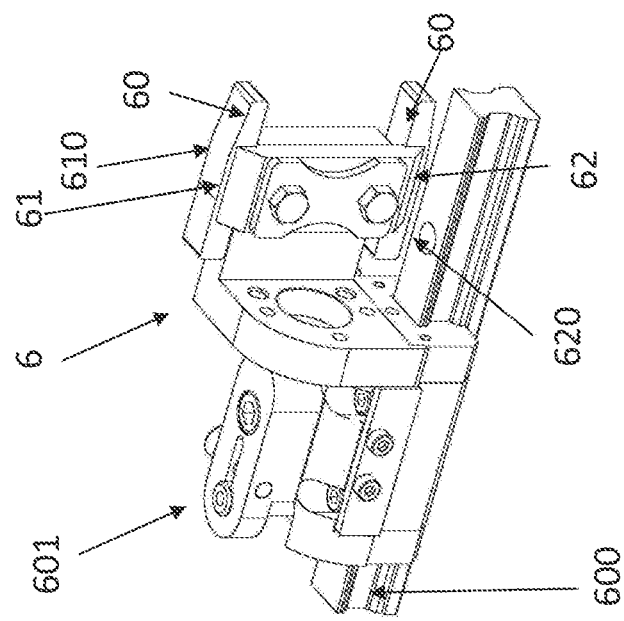
FIGS. 8 and 9 are perspective views of two different details of the system according to the invention.
Figure 8:
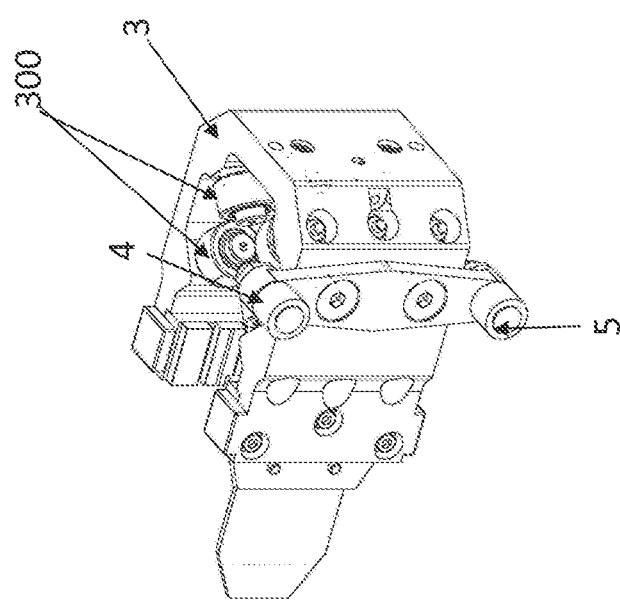

Generally speaking, the inserting element 6 preferably comprises an end portion 601 which is connected to an auxiliary guide 600 (which, for example in FIG. 9, is a straight auxiliary guide 600) to allow movement (specifically, translational movement) of the inserting element 6 between the retracted position R and the advanced position A (by means of a dedicated mechanism). The inserting element 6 comprises a free end portion 60, which is opposite to the connected end portion 601 and which, in the first embodiment, is inserted between the two abutment elements 4, 5.

In the first embodiment illustrated, with reference in particular to FIGS. 2-7 and 9, the free end portion 60 of the inserting element 6 is tapered (that is to say, its width gradually decreases) to make it easier for the inserting element 6 to be inserted between the two abutment elements 4, 5. In this case, therefore, moving the inserting element 6 between the abutment elements 4, 5 is even easier.

Figure 11:
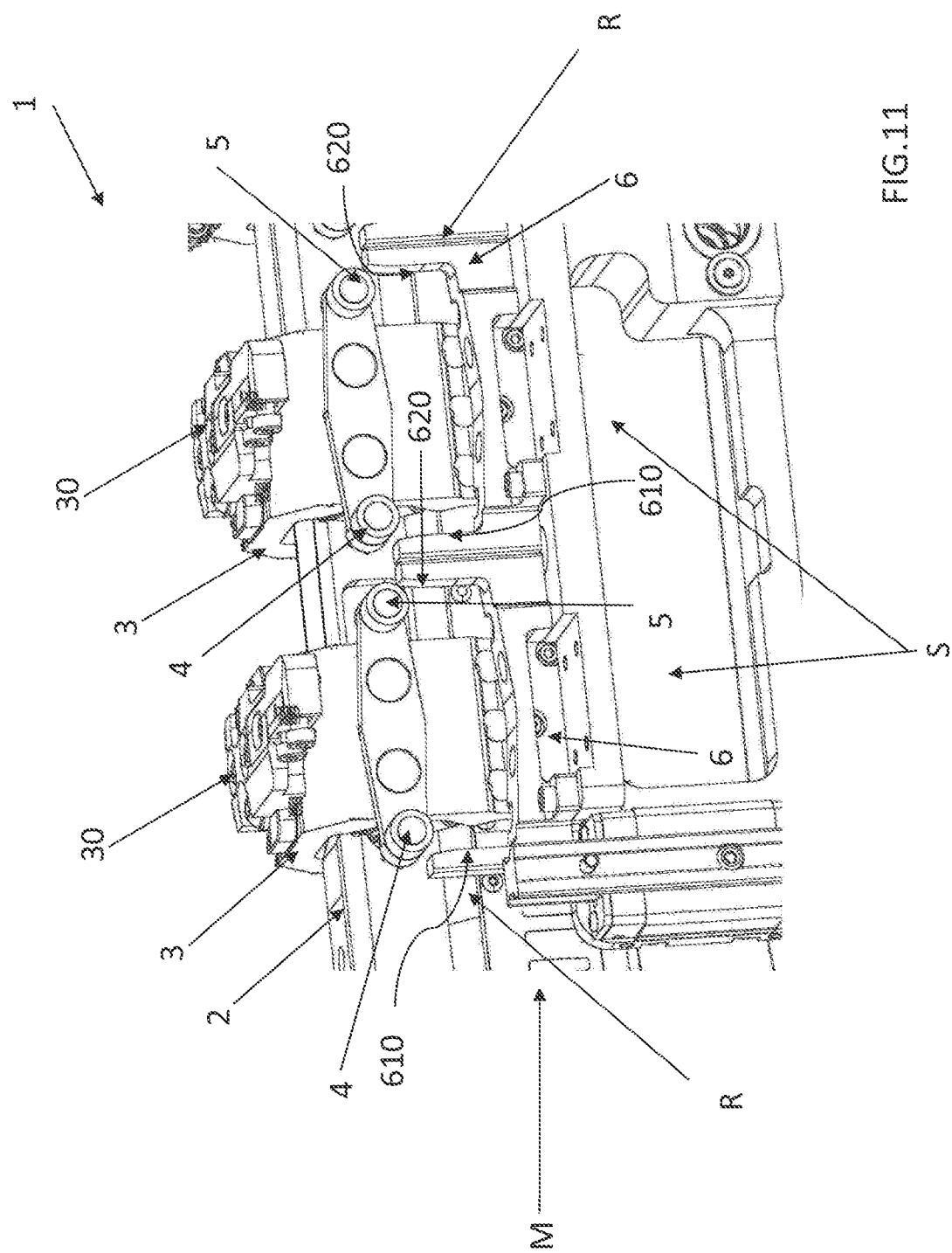
FIG. 11 is a partial view of a system for conveying electronic cigarette components, in a first operating configuration, according to a second embodiment of the invention.
Figure 12:
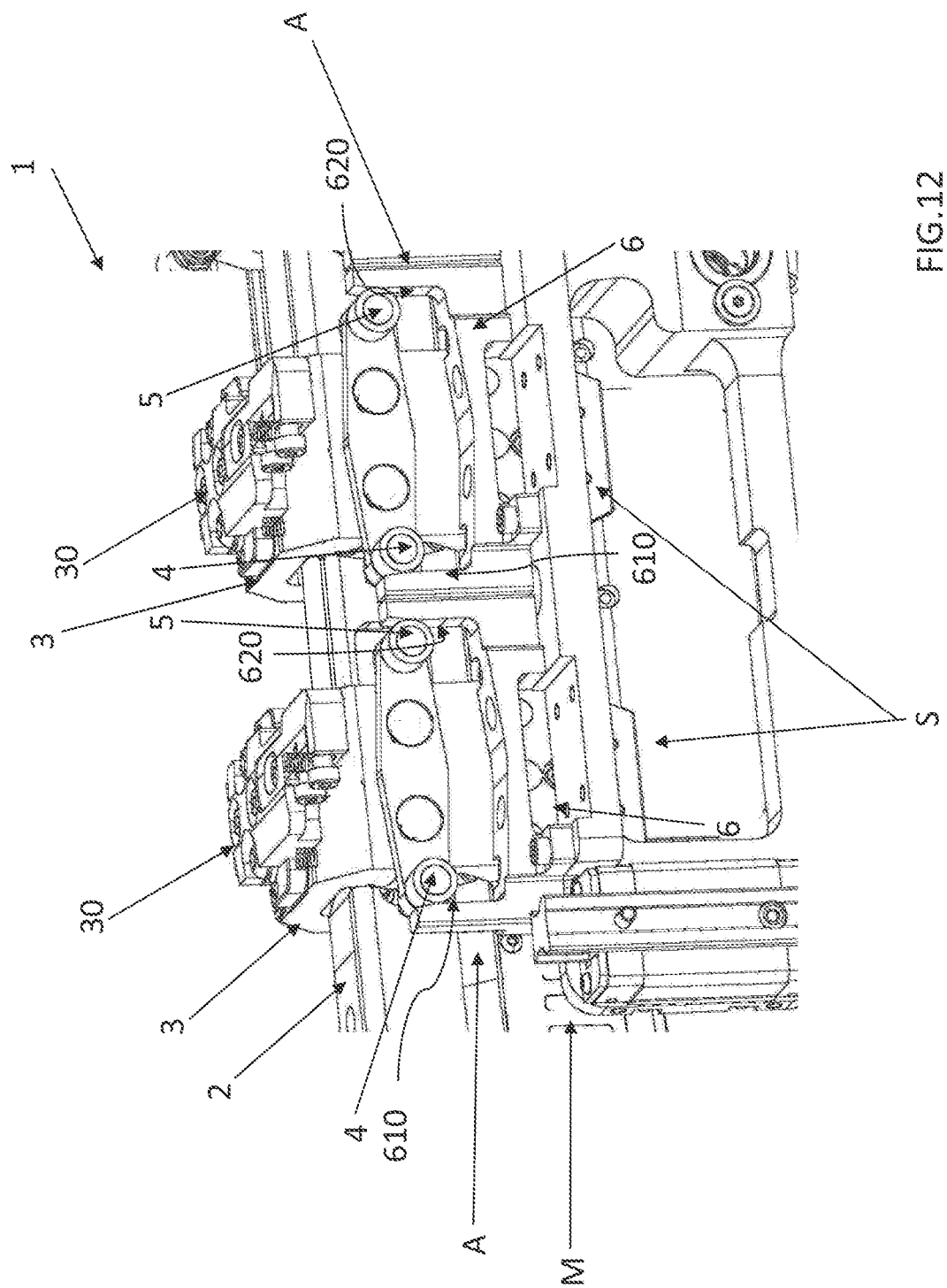
FIG. 12 is a view like that of FIG. 11 but with the system in a second operating configuration.
Figure 13:
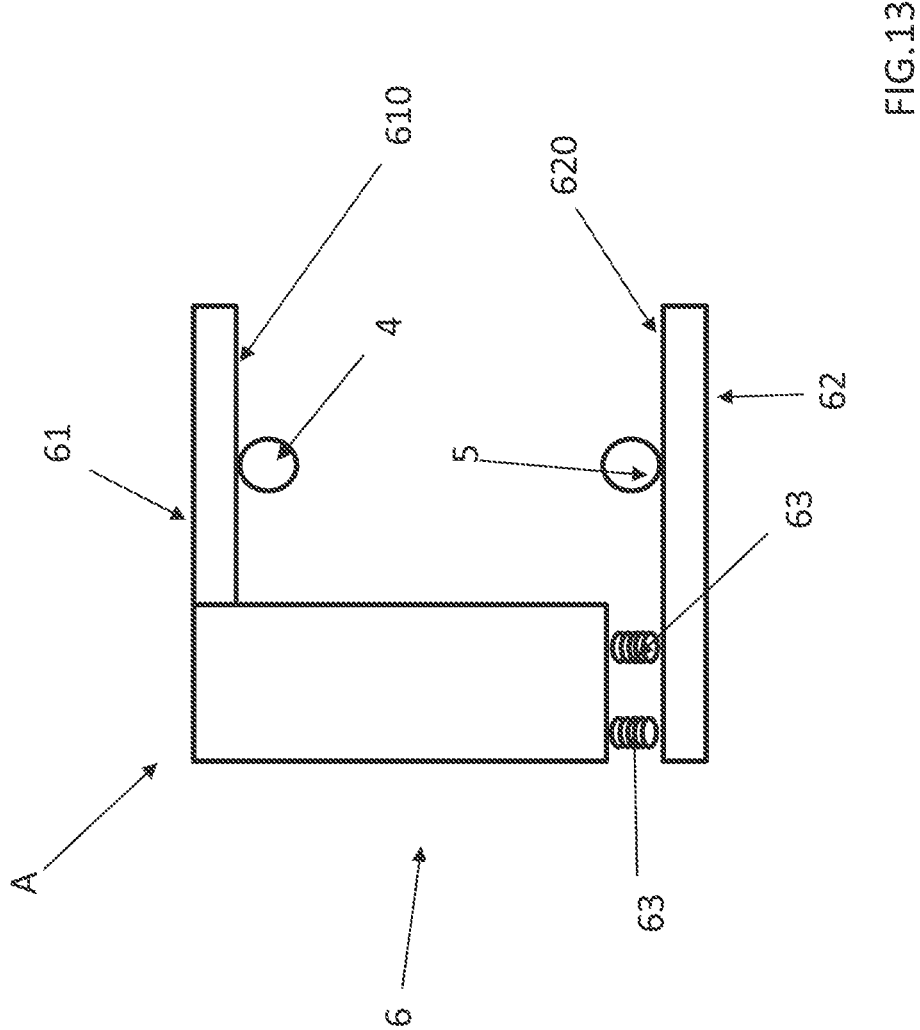
FIG. 13 is a schematic plan view of some details of the system according to the second embodiment of the invention, in a variant similar to the one illustrated in FIG. 10.

FIGS. 11-13 show a second embodiment of the system 1 according to the invention. In this second embodiment, the inserting element 6 is shaped in such a way that its first edge 610 and its second edge 620 are mutually spaced apart (and in turn shaped) to allow the two abutment elements 4, 5 to be inserted between them when the carriage 3 is at the stopping station S. Further, the inserting element 6 is movable between the retracted position R, where the first edge 610 and the second edge 620 do not receive the two abutment elements 4, 5 between them and allow the carriage 3 to slide relative to the guide 2, and the advanced position A where the first edge 610 and the second edge 620 do receive the two abutment elements 4, 5 between them, come into contact with the abutment elements 4, 5 and prevent the carriage 3 from sliding relative to the guide 2. This embodiment effectively locks the carriage 3 in place relative to the guide 2, thereby positioning it particularly precisely. In this embodiment, the edges 610, 620 are spaced further apart than they are in the embodiment described previously.

Figure 2:
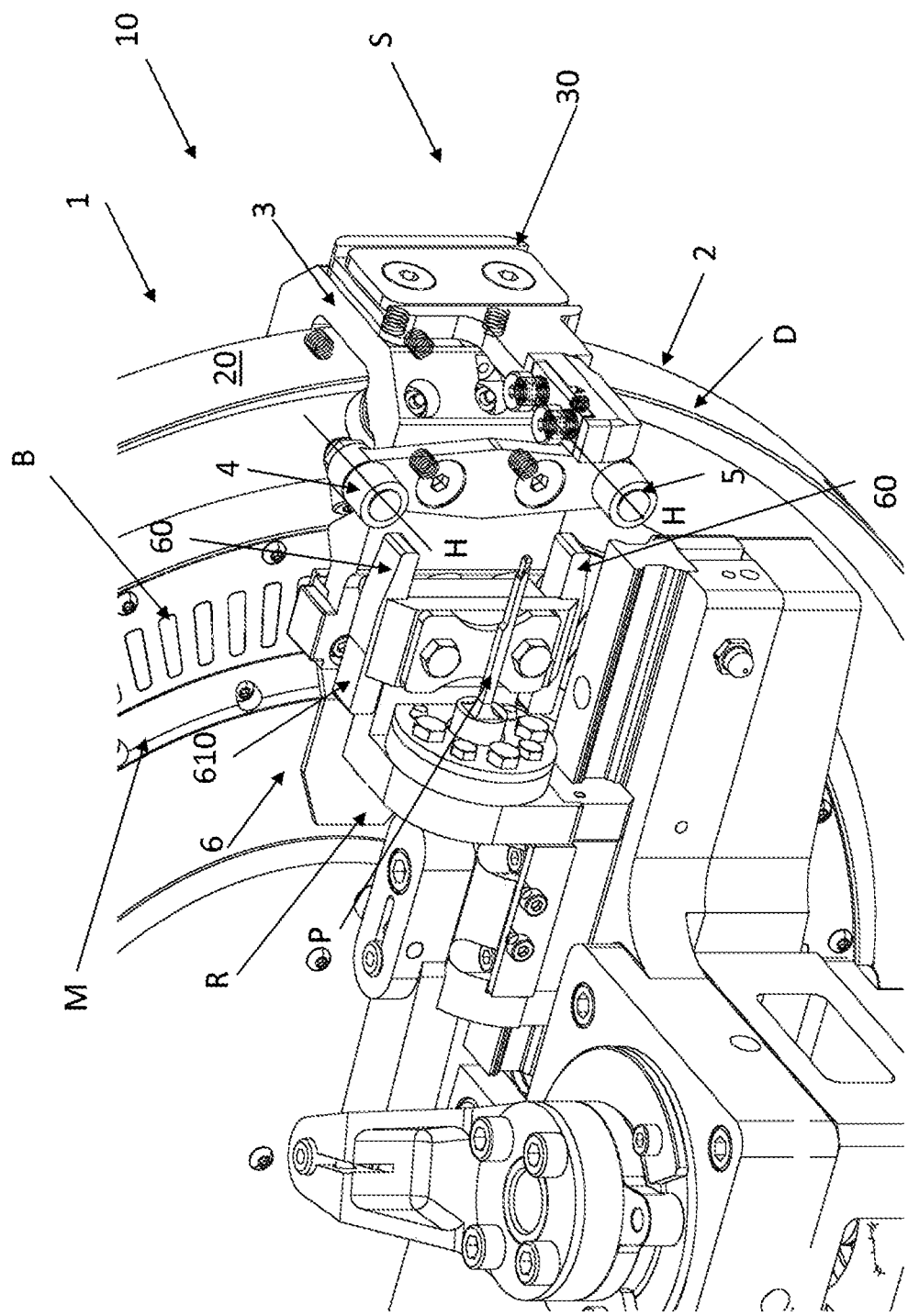
FIG. 2 is a view like that of FIG. 1 but enlarged, with the conveying system in a first operating situation.
Figure 3:
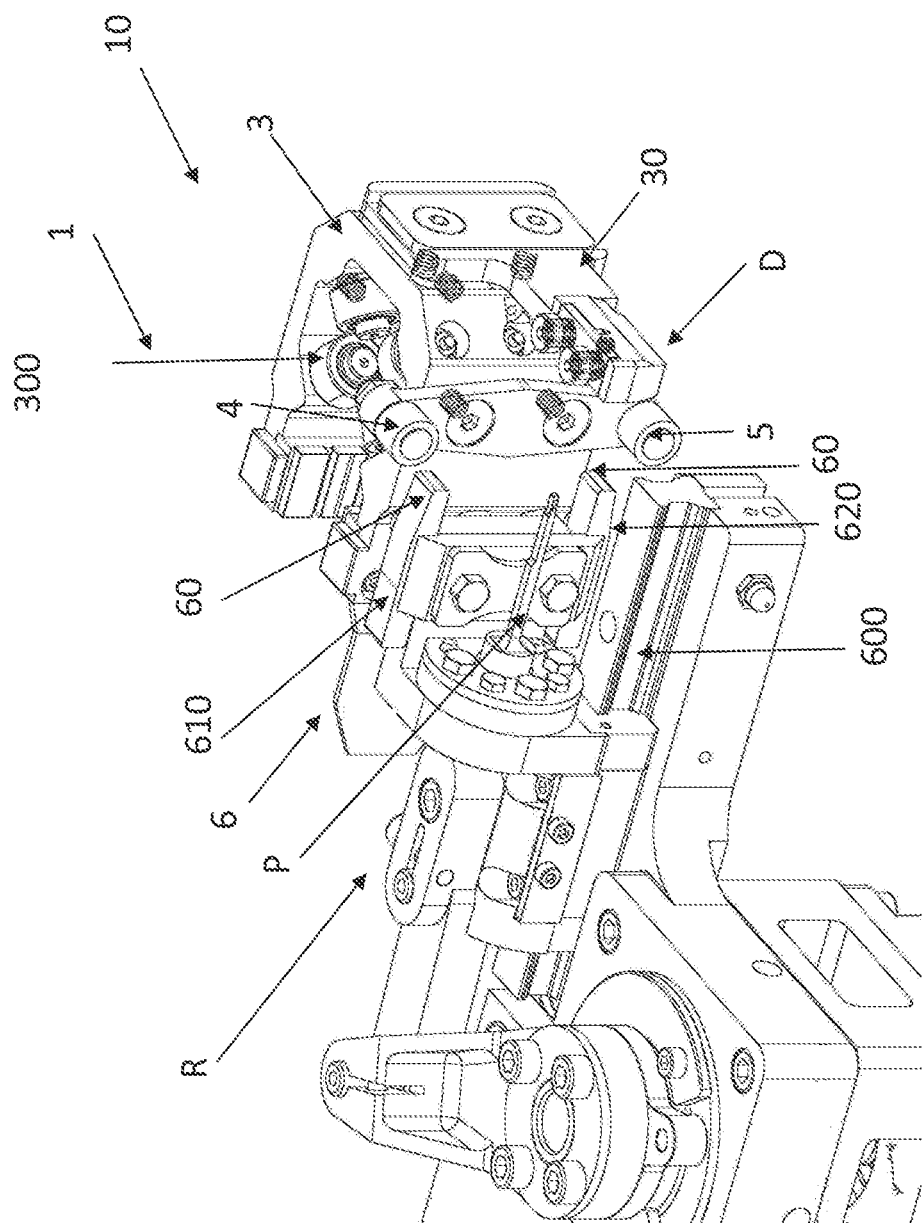
FIG. 3 is a view like that of FIG. 2 but with some parts cut away in order to better illustrate others.
Figure 4:
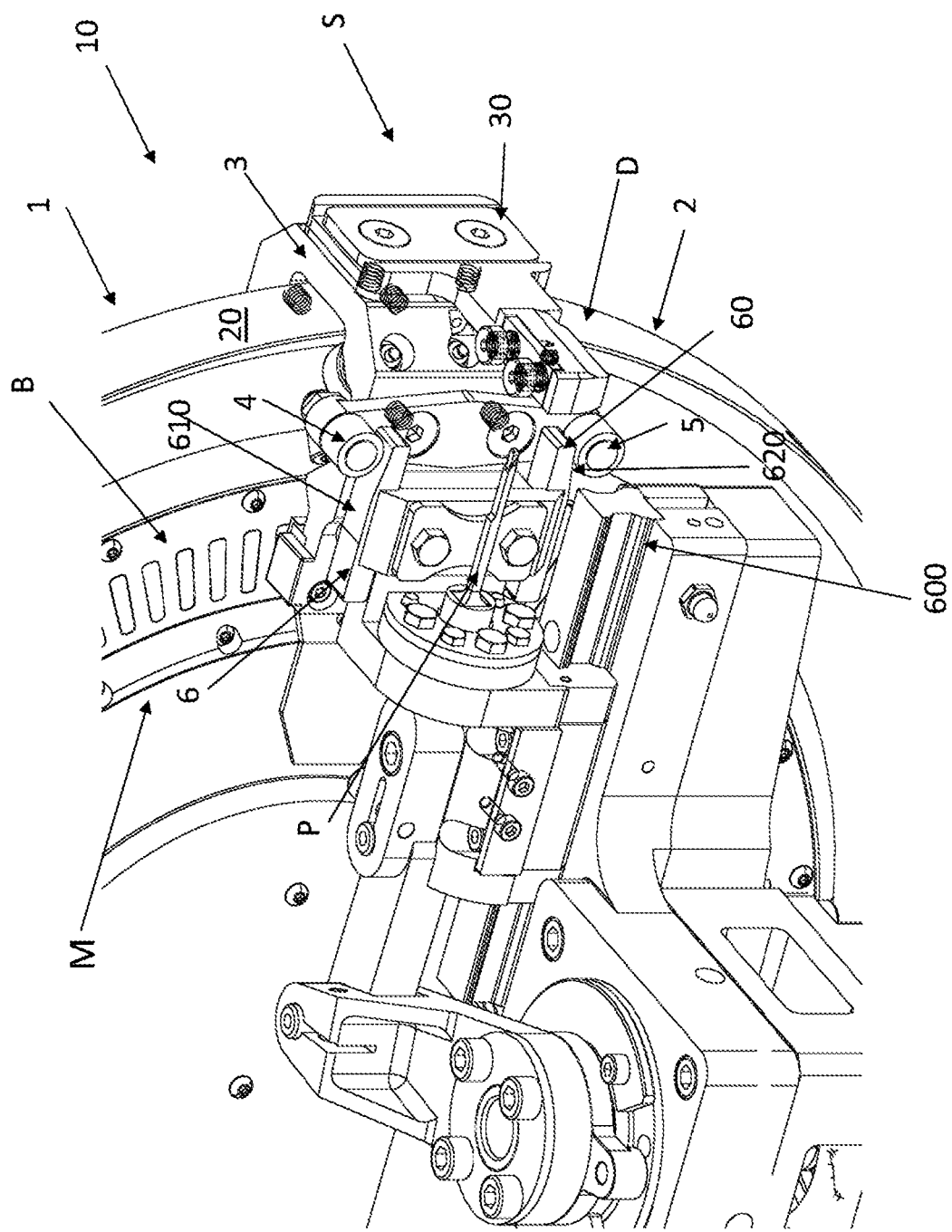
FIG. 4 and FIG. 5 are views like those of FIG. 2 and FIG. 3, respectively, but with the system in a second operating configuration.
Figure 5:
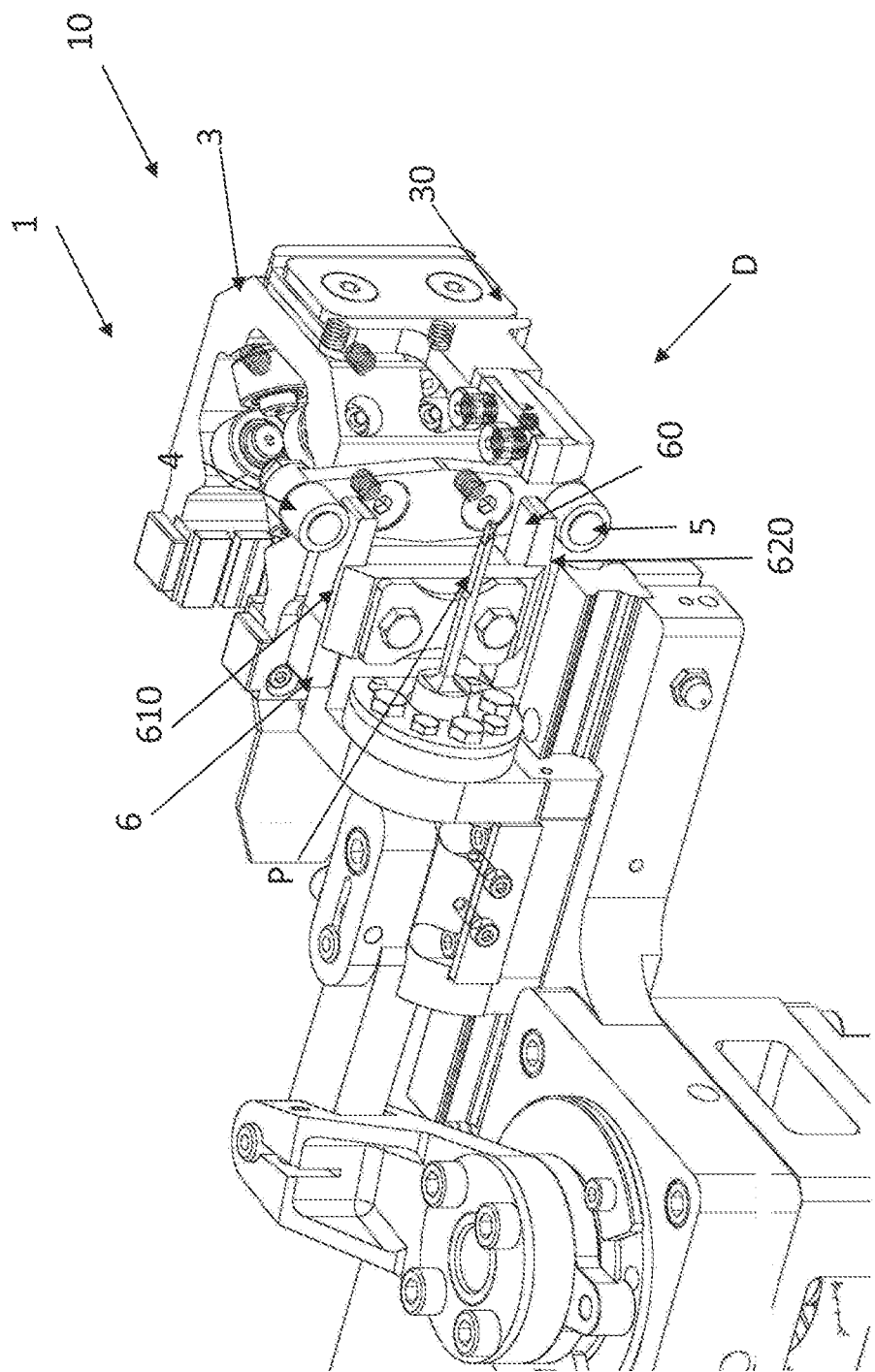
Figure 6:
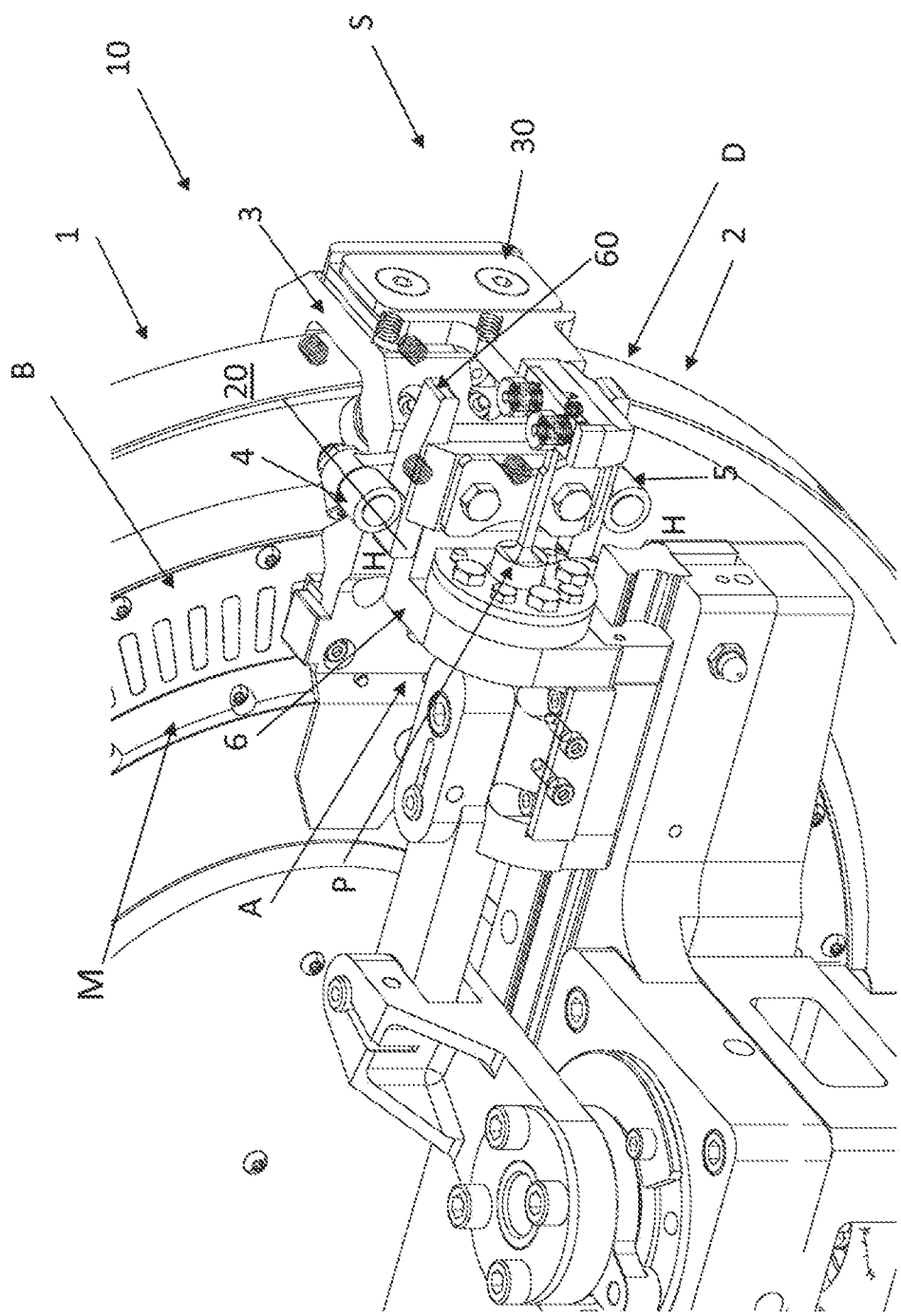
FIG. 6 and FIG. 7 are views like those of FIG. 2 and FIG. 3, respectively, but with the system in a third operating configuration.
Figure 7:
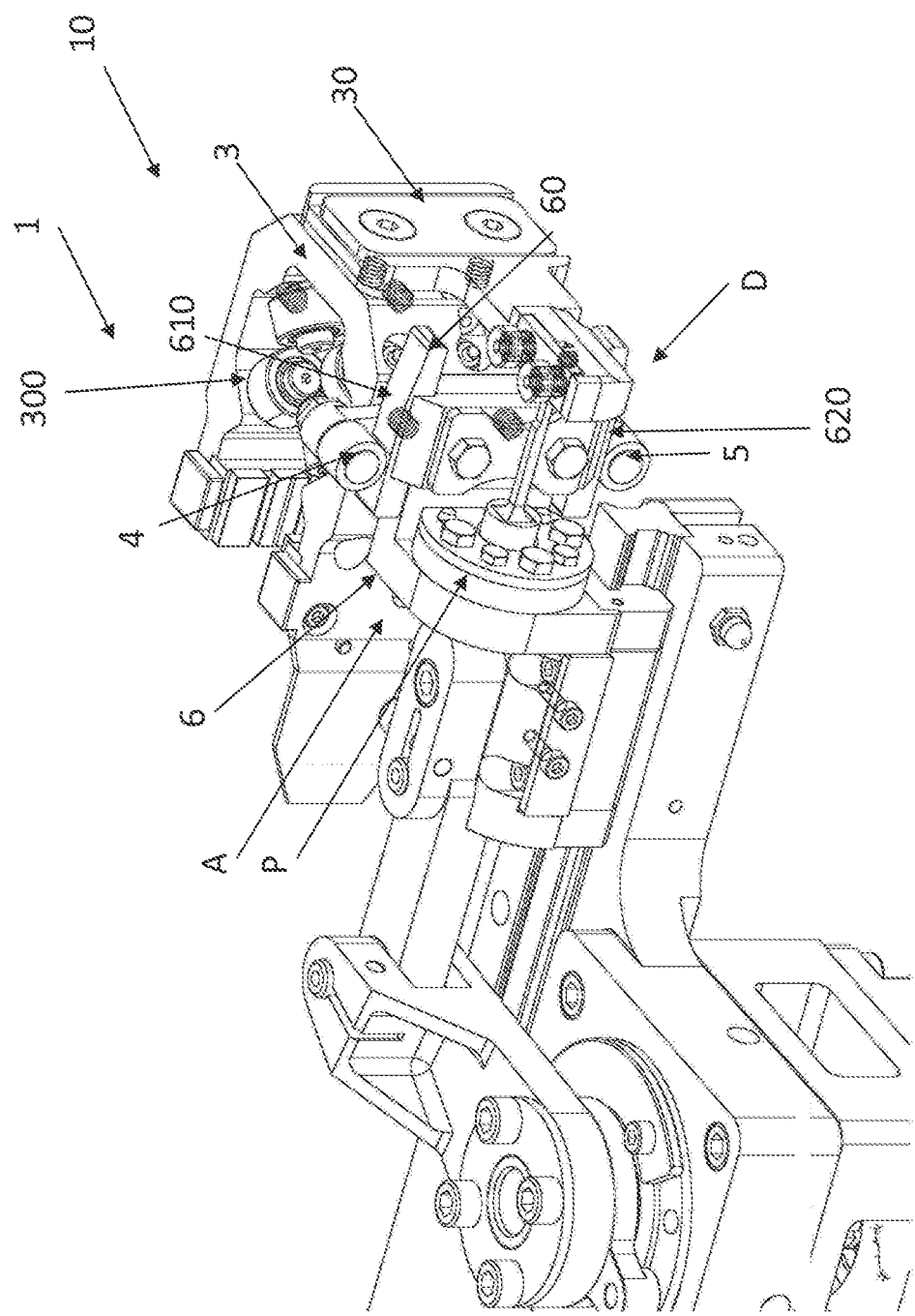

The retracted position R of the inserting element 6 is illustrated in FIGS. 2 and 3 with reference to the first embodiment described previously and in FIG. 11 with reference to the second embodiment just described. The advanced position A of the inserting element 6 is illustrated in FIGS. 6 and 7 and 10 with reference to the first embodiment and in FIGS. 12 and 13 with reference to the second embodiment. Lastly, with reference to the first embodiment, an intermediate position of the inserting element 6, between the retracted position R and the advanced position A, is illustrated in FIGS. 5 and 6.

Preferably, once the carriage 3 has been positioned at the stopping station S and the inserting element 6 is at the advanced position A, the clearance between the inserting element 6 and both of the abutment elements 4, 5 is zero to prevent unwanted movement of the carriage 3 relative to the guide 2.

With reference to the accompanying drawings, the inserting element 6 comprises a first part 61 comprising the aforementioned first edge 610 intended to come into contact with one of the two abutment elements 4 when the inserting element 6 is at the advanced position A; and a second part 62 comprising the aforementioned second edge 620 intended to come into contact with the other abutment element 5 when the inserting element 6 is at the advanced position A. With reference in particular to FIG. 9, the first part 61 and the second part 62 form two protuberances, each having a tapered free end 60.

In the variant schematically represented in FIG. 10 and in FIG. 13, the inserting element 6 also comprises elastic means 63 to join together the first part 61 and the second part 62 and to keep the first edge 610 and the second edge 620 pressed against the respective abutment element 4, 5 when the inserting element 6 is at the advanced position A.

Advantageously, this variant completely eliminates any clearance (that is, gap) between the inserting element 6 (at the advanced position A) and the abutment elements 4, 5, thanks to the presence of the elastic means 63 (which may comprise a spring, as illustrated in FIG. 10). In effect, the elastic means 63 are designed to apply an elastic force such as to keep the first edge 610 and the second edge 620 each pressed in contact with an abutment element 4, 5.

At the same time, the elastic means 63 prevent the abutment elements 4, 5 from becoming deformed which, over time, would cause their wearing out and failure.

In the case described above, therefore, the inserting element 6 comprises two parts, a first part 61 and a second part 62, which are distinct and held together by the elastic means 63. In particular, in this case, too, the first part 61 and the second part 62 form two protuberances which may be tapered.

In particular, the variant of FIG. 10 relates to the first embodiment described above, where the inserting element 6 is inserted between the two abutment elements 4, 5; the variant of FIG. 13, on the other hand, relates to the second embodiment described above, where the inserting element 6 receives the two abutment elements 4, 5 between its two edges 610, 620.

Preferably, the two abutment elements 4, 5 are two idler wheels or rollers (for example, cylindrical in shape) mounted on the carriage 3. The axis of rotation H (which, for simplicity, is shown by way of example only in FIGS. 2 and 6) is, for example, a longitudinal axis H of each abutment element 4, 5. In the case of wheels or rollers with circular cross section, the axis of rotation H may pass through the centre of the circular cross section.

With reference to the accompanying drawings, the carriage 3 defines a U shape, for example (clearly shown in FIG. 8), whose hollow accommodates the wheels 300 to allow the carriage 3 to run long the guide 2. The abutment elements 4, 5, on the other hand, are each connected to the outside of the carriage 3, specifically to one of the two branches of the U. In FIGS. 1-7 and 11-12, the carriage 3 is shown in use and thus, the retaining means 30 for holding the components of an electronic cigarette are also shown.

In the preferred embodiment, the guide 2 comprises at least one curved portion 20 and the stopping station S is disposed at the curved portion 20 of the guide 2 (as illustrated in FIGS. 1, 2, 4, 6). This solution is particularly advantageous because stopping a carriage 3 is generally more complicated at a part of the guide 2 which is not straight (as explained in more detail below). Obviously, the stopping station S might also be disposed at a straight portion of the guide 2, as illustrated, for example, in FIGS. 11 and 12.

Preferably, the guide 2 forms a closed loop.

For example, the guide 2 comprises a plurality of modular parts connected to each other to form a slideway for the carriage 3. Advantageously, it is thus possible to configure the slideway of the carriage 3 on a case-by-case basis, according to needs.

Preferably, as illustrated in FIGS. 1, 2, 4 and 6, the system 1 also comprises a linear motor M (at least one) equipped with a plurality of electromagnetic coils B (shown only in FIGS. 1, 2, 4 and 6) which is connected to the guide 2 and which extends along the guide 2, obviously on the side opposite to that where the carriage 3 runs. In this embodiment, the system 1 also comprises a plurality of magnets (permanent magnets not shown in the accompanying drawings), which are mounted on the carriage 3 (for example on each side of the carriage 3) and which interact with the coils B of the linear motor M to allow and control the movement of the carriage 3 along the guide 2.

In the preferred embodiment, where the system 1 comprises more than one carriage 3, the presence of the linear motor M and of the magnets allows the carriages to be driven independently and in a particularly practical manner.

With regard to the embodiment just described, which comprises a linear motor M and magnets for driving the carriage 3, the mechanical locking of the carriage 3 is particularly advantageous because it constitutes a system for locking and positioning the carriage 3 additional to the system controlled by the linear motor M. More specifically, stopping the carriage 3 at a stopping station S by controlling the linear motor M may in some cases be imprecise, especially if the stopping station S is located at a curve 20 of the guide 2 (as illustrated in the accompanying drawings). In effect, at curved stretches of the guide 2, the magnets on the carriage 3 tend to modify their orientation (compared to their orientation when the carriage 3 is on straight stretches of the guide 2), thus altering the magnetic field and causing possible imprecision if the carriage 3 has to be stopped at that point.

With reference to what is stated above regarding the modularity of the guide 2, the linear motor M may also be modular, that is to say, there may be a plurality of motor modules connectable to each other like the guide 2.

For example, the conveying system 1 may comprise a plurality of carriages 3, a plurality of locking units 4, 5, 6 and a plurality of stopping stations S disposed along the guide 2. The inserting elements 6 of the locking units 4, 5, 6 may be disposed at all the stopping stations S or only at some of them (for example, only at stopping stations S disposed along curved portions 20 of the guide 2).

This invention also relates to a machine 10 for assembling electronic cigarette components (shown only partly in FIGS. 1-7), comprising a system 1 for conveying electronic cigarette components according to one of the embodiments described above, and a plurality of assembly stations D (only one of which is shown in the drawings) where the electronic cigarette components are assembled.

Each assembly station D comprises assembly means P designed to assemble (and if necessary, feed) a particular component. More in detail, an assembly station D is disposed at the stopping station S (in the case where there is only one stopping station).

Obviously, the carriage 3 can thus be stopped and positioned precisely at the assembly station D where the operations which require extreme precision can be carried out on the components.

In the example illustrated in FIGS. 1-8, the assembly means P of the assembly station D which is disposed at the stopping station S are mounted on the inserting element 6. The assembly means P are also designed to hold an electronic cigarette component to be assembled and to assemble it to other components held on the carriage 3 when the inserting element 6 is moved to the advanced position A.

Advantageously, a single movement (that is, a single drive) is sufficient to lock the carriage 3 relative to the guide 2 and to perform an assembly operation. This solution is also particularly simple in structure and compact in size.

For example, the aforementioned assembly means P comprise a pusher (see FIGS. 1-7).

Obviously, since each assembly station D is normally dedicated to assembling one particular component, the assembly means P in the stations are often different from each other. The assembly means P, therefore, are not necessarily integrated with the inserting element 6 to operate in conjunction therewith.

Below is a brief description of the operation of the assembling machine 10 in the example where the carriages are driven by a linear motor M and magnets, and with reference in particular to FIGS. 1-7. A first carriage 3 runs along the guide 2 as far as the stopping/assembly station S, D (where the first component is fed and held on the carriage 3). If locking by mechanical means is necessary (for example, in the case of assembly stations located on a curve 20), when the carriage 3 is positioned at the stopping stations S, the inserting element 6 is moved from the retracted position R to the advanced position A, to be inserted between and, come into contact with, the two abutment elements 4, 5. After the first component has been fed and held on the carriage 3, the inserting element 6 is moved from the advanced position A to the retracted position R, becoming disengaged from the abutment elements 4, 5 and allowing the carriage 3 to move along the guide 2 again. The first carriage 3 can then move to a second assembly/stopping station D, S where the above operations are repeated in order to assemble a second component to the first component already being held on the carriage 3.

The above operations are repeated until all the components are assembled on the carriage 3. Obviously, the presence of more than one carriage 3 moved independently of each other along the guide 2 allows optimizing the overall productivity of the machine 10.

The invention claimed is:

1. A machine for assembling electronic cigarette components, comprising:
   a system for conveying the electronic cigarette components, comprising:
   a guide comprising a stopping station;
   a carriage configured to slide along the guide and including a retaining mechanism for holding at least one of the electronic cigarette components;
   a locking unit for locking the carriage relative to the guide at the stopping station, the locking unit comprising:
   two abutment elements mounted on the carriage and disposed at a predetermined mutual distance;
   an inserting element which is: disposed at the stopping station; shaped such that first and second edges of the inserting element come into contact with the two abutment elements, respectively, when the carriage is at the stopping station; movable between a retracted position, where the inserting element does not contact the two abutment elements and allows the carriage to slide relative to the guide, and an advanced position where the inserting element contacts the two abutment elements, thereby preventing the carriage from sliding relative to the guide;
   and wherein each of the two abutment element is rotatable about an axis thereof to facilitate movement of the inserting element between the retracted and advanced positions;
   a plurality of assembly stations, each comprising an assembly mechanism, where the electronic cigarette components are assembled; and
   wherein one of the assembly stations is disposed at the stopping station.

2. The machine according to claim 1, wherein the assembly mechanism of the one of the assembly stations which is disposed at the stopping station is: mounted on the inserting element; and configured to hold one of the electronic cigarette components to be assembled and to assemble the one of the electronic cigarette components when the inserting element is moved to the advanced position.

3. The machine according to claim 2, wherein the assembly mechanism comprises.

4. The machine according to claim 3, and further comprising a linear motor including a plurality of electromagnetic coils which are connected to the guide and which extend along the guide; and a plurality of magnets which are mounted on the carriage and which interact with the coils of the linear motor to allow and control the sliding of the carriage along the guide.

5. The machine according to claim 1, and further comprising a linear motor including a plurality of electromagnetic coils which are connected to the guide and which extend along the guide; and a plurality of magnets which are mounted on the carriage and which interact with the coils of the linear motor to allow and control the sliding of the carriage along the guide.

6. The machine according to claim 1, wherein the assembly mechanism comprises a pusher.

\* \* \* \* \*